United States Patent
Sippel, II et al.

(10) Patent No.: US 10,506,414 B1
(45) Date of Patent: Dec. 10, 2019

(54) WIRELESS RELAY DELIVERY OF COMMERCIAL MOBILE ALERT SYSTEM (CMAS) INFORMATION TO WIRELESS USER DEVICES

(71) Applicant: Sprint Communications Company L.P., Overland Park, KS (US)

(72) Inventors: Jack Branson Sippel, II, Overland Park, KS (US); Bhanu Prakash Voruganti, Overland Park, KS (US); Julio C. Costa, Tampa, FL (US); John W. Davis, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/947,153

(22) Filed: Apr. 6, 2018

(51) Int. Cl.
*H04W 4/02* (2018.01)
*H04W 4/90* (2018.01)
*H04W 76/50* (2018.01)
*H04W 88/18* (2009.01)

(52) U.S. Cl.
CPC .............. *H04W 4/90* (2018.02); *H04W 76/50* (2018.02); *H04W 88/182* (2013.01)

(58) Field of Classification Search
None
See application file for complete search history.

(56) References Cited

U.S. PATENT DOCUMENTS

| 9,699,767 | B2 | 7/2017 | Adachi et al. | |
| 2012/0250501 | A1 | 10/2012 | Lee | |
| 2013/0114484 | A1 | 5/2013 | Suzuki et al. | |
| 2013/0172023 | A1 | 7/2013 | Chan et al. | |
| 2013/0201903 | A1* | 8/2013 | Takahashi | H04W 16/26 370/315 |
| 2013/0281045 | A1* | 10/2013 | Daly | H04W 4/90 455/404.1 |
| 2014/0071957 | A1 | 3/2014 | Xu et al. | |
| 2014/0134970 | A1 | 5/2014 | Pazos et al. | |
| 2014/0171062 | A1 | 6/2014 | Fallgren et al. | |
| 2015/0245402 | A1* | 8/2015 | Mochizuki | H04W 76/15 370/331 |

* cited by examiner

*Primary Examiner* — Gary Lafontant

(57) ABSTRACT

A wireless relay wirelessly transmits Commercial Mobile Alert System (CMAS) information to wireless user devices. In the wireless relay, network circuitry wirelessly receives a CMAS broadcast having the CMAS information from a wireless communication network. The network circuitry responsively generates a wireless relay instruction having the CMAS information. The network circuitry transfers the wireless relay instruction to user circuitry in the wireless relay. The user circuitry receives the wireless relay instruction having the CMAS information, and in response, wirelessly transmits the CMAS information to the wireless user devices.

20 Claims, 7 Drawing Sheets

WIRELESS RELAY DELIVERY OF COMMERCIAL MOBILE ALERT SYSTEM (CMAS) INFORMATION TO WIRELESS USER DEVICES

TECHNICAL BACKGROUND

The United States government has sponsored emergency alert systems to notify the public about severe weather and other public emergencies. The emergency alert systems use sirens and flashing lights for local emergency notifications. With the deployment of radio and television networks, radio and television signals have also been used to broadcast emergency alerts to user radios and televisions. In 2006, the federal government enacted a Commercial Mobile Alert System (CMAS) that broadcasts emergency notifications to wireless phones in dynamically-specified CMAS broadcast areas.

Long Term Evolution (LTE) networks are geographically sectioned into Tracking Areas (TAs) to locate wireless phones for paging and other wireless communication services. When the CMAS issues emergency CMAS information, the CMAS includes the Tracking Area Codes (TACs) for the TAs that overlay the specified CMAS broadcast area. In the LTE network, a Mobility Management Entity (MME) receives the CMAS information and the TACs from the CMAS.

The MME transfers the CMAS information and the TACs to evolved NodeBs (eNodeBs) in the LTE network. The eNodeBs in the TACs will detect their own TAC and responsively broadcast the CMAS information to LTE User Equipment (UEs). The CMAS information broadcast typically uses LTE System Information Blocks (SIBs) 1 and 12. The LTE UEs wirelessly receive the CMAS information and responsively alert their users and display the CMAS information. For example, the LTE UEs around the location of a child abduction would wirelessly receive CMAS Amber Alerts, and in response, the LTE UEs would alert their users and display information about the child abduction in hopes of saving the child with public support.

The LTE networks are deploying wireless relays to extend their wireless communication service footprint. The wireless relays have internal LTE eNodeBs to serve LTE UEs. The wireless relays also have internal relay-UEs that communicate with macro LTE eNodeBs. Thus, a wireless relay eNodeB communicates with its serving macro eNodeB over the relay-UE. Unfortunately, these wireless relays have not been optimized to broadcast CMAS information in an effective and efficient manner.

TECHNICAL OVERVIEW

A wireless relay wirelessly transmits Commercial Mobile Alert System (CMAS) information to wireless user devices. In the wireless relay, network circuitry wirelessly receives a CMAS broadcast having the CMAS information from a wireless communication network. The network circuitry responsively generates a wireless relay instruction having the CMAS information. The network circuitry transfers the wireless relay instruction to user circuitry in the wireless relay. The user circuitry receives the wireless relay instruction having the CMAS information, and in response, wirelessly transmits the CMAS information to the wireless user devices.

DETAILED DESCRIPTION

Figure 1:
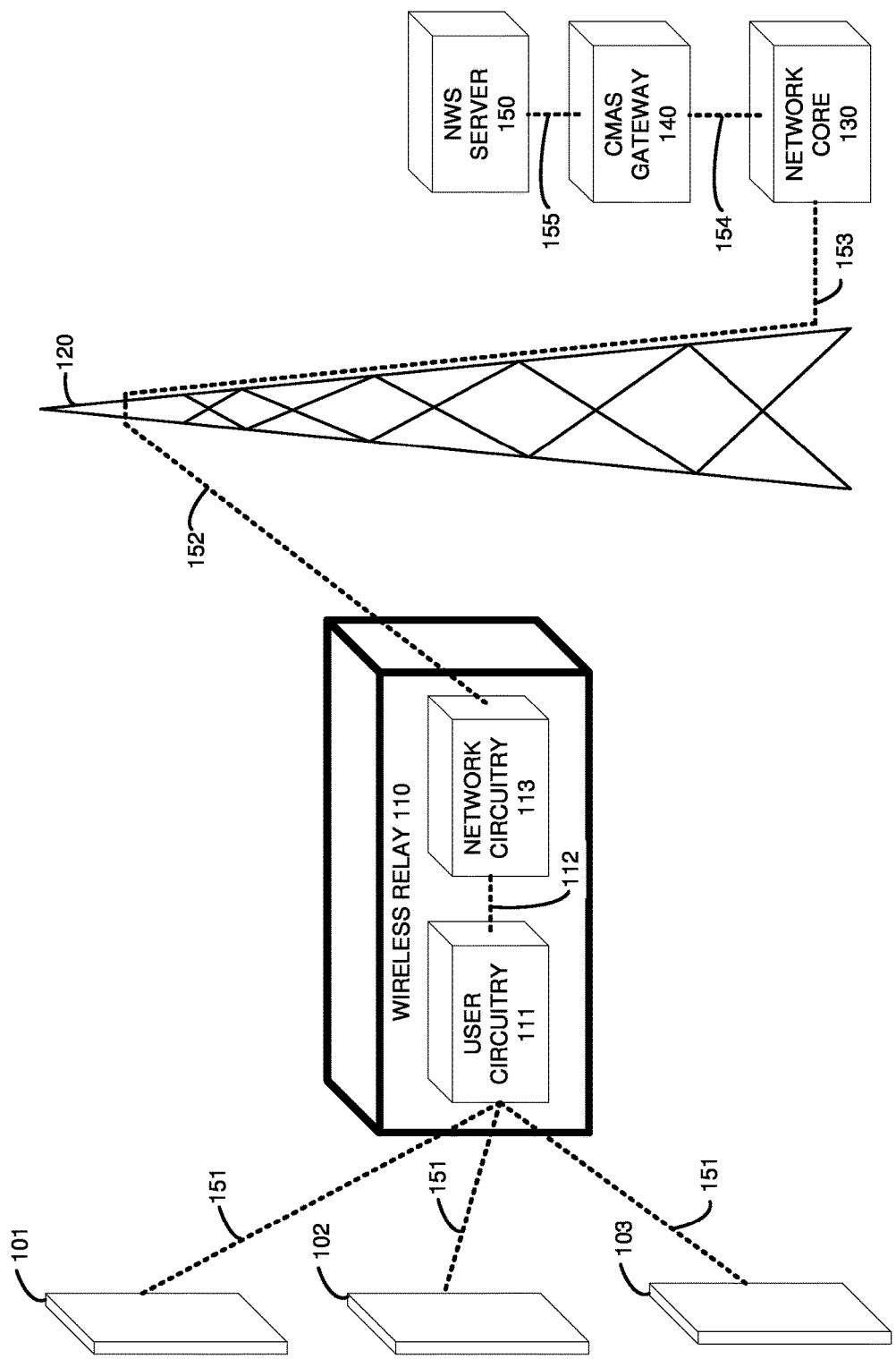
FIG. 1 illustrates a wireless relay to wirelessly transmit Commercial Mobile Alert System (CMAS) information to wireless user devices.

FIG. 1 illustrates wireless relay 110 to wirelessly transmit Commercial Mobile Alert System (CMAS) information to wireless user devices 101-103. Wireless user devices 101-103 could be computers, phones, headsets, graphic displays, intelligent machines, or some other user apparatus having a wireless transceiver and user interface. Wireless relay 110 comprises user circuitry 111, data link 112, and network circuitry 113. User circuitry 111 comprises antennas, modulators, amplifiers, filters, digital/analog interfaces, Digital Signal Processors (DSPs), Central Processing Units (CPUs), Random Access Memory (RAM), persistent data storage, and bus interfaces. User circuitry 111 further comprises software like operating systems, physical layer modules, media access control modules, radio link control modules, radio resource control modules, internet protocol modules, CMAS modules, and other networking modules. User circuitry 111 and wireless user devices 101-103 use wireless network protocols like Fifth Generation New Radio (5G NR), Long Term Evolution (LTE), and Institute of Electrical and Electronic Engineers (IEEE) 802.11. User circuitry 111 and network circuitry 113 communicate over data link 112. Data link 112 may comprise an IEEE 802.3 (Ethernet) switch, Internet Protocol (IP) network, Point-to-Point (P2P) mesh, fiber optic coupling, microwave signaling, or some other data network coupling.

Network circuitry 113 comprises antennas, modulators, amplifiers, filters, digital/analog interfaces, DSPs, CPUs, RAM, persistent data storage, and bus interfaces. Network circuitry 111 further comprises software like operating systems, physical layer modules, media access control modules, radio link control modules, radio resource control modules, internet protocol modules, CMAS modules, and other networking modules. Network circuitry 111 and wireless access point 120 use wireless network protocols like 5G NR, LTE, and IEEE 802.11.

User circuitry 111 and network circuitry 113 comprise computer hardware and software that are configured and integrated together to form a special-purpose machine—a wireless relay that provides data communication services to wireless user devices and that also efficiently and effectively delivers CMAS data to the wireless user devices. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like Control Units (CUs), Logic Units (LUs), and Random Access Memory (RAM). In turn, the CUs, LUs, and RAM are metallically connected to form CPUs, DSPs, GPUs, transceivers, bus circuitry, and memory.

In the computer hardware, the CUs drive data between the RAM and the LUs, and the LUs operate on the data. The CUs also drive interactions with external memory like flash drives, disk drives, and the like. The computer hardware executes machine-level software to control and move data by driving machine-level inputs like voltages and currents to the CUs, LUs, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware into the special-purpose wireless relays described herein.

In an exemplary operation of wireless relay 110, National Weather Service (NWS) server 150 issues geographically-focused weather warnings to wireless user devices 101-103 as follows. NWS server 150 generates CMAS information and geographic data that indicates a geographic area for a CMAS information broadcast. For example, NWS server 150 might transfer an imminent tornado warning for a specific geographic area that corresponds to the projected tornado path. The geographic area could be specified by continually updated sets of geographic coordinates. Other CMAS-enabled servers, such as an Amber Alert server, could operate in a similar fashion. NWS server 150 transfers the CMAS information and the geographic data to CMAS gateway over data link 155.

CMAS gateway 140 receives the CMAS information and the geographic data. CMAS gateway 140 translates the geographic data into the Tracking Area Codes (TACs) for the wireless networks. The TACs identify wireless network Tracking Areas (TAs) located in the CMAS broadcast area. CMAS gateway 140 may also translate the geographic data or the TACs into wireless access point identifiers for the wireless access points in the TACs. The wireless access point identifiers indicate the wireless access points located in the CMAS broadcast area. CMAS gateway 140 transfers the CMAS information and the TACs and/or access point identifiers to the wireless networks. In this example, CMAS gateway 140 transfers the CMAS information and the TACs and/or identifiers to network core 130 in one of the wireless networks over data link 154.

Network core 130 transfers the CMAS information and the TACs and/or wireless access point identifiers to the wireless access points in the wireless network. Thus, network core 130 transfers the CMAS information to wireless access point 120 over data link 153 along with the TACs and/or access point identifiers—including the TAC and/or identifier for wireless access point 120.

Wireless access point 120 receives the CMAS information and detects its own TAC and/or identifier. In response to detecting its own TAC and/or identifier, wireless access point 120 wirelessly transmits CMAS broadcast 152 indicating the CMAS information. Wireless relay 110 receives CMAS broadcast 152, and although not shown for clarity, CMAS broadcast 152 propagates to other wireless communication devices as well.

In wireless relay 110, network circuitry 113 wirelessly receives CMAS broadcast 152 having the CMAS information. In response to receiving CMAS broadcast 152, network circuitry 113 generates a wireless relay instruction having the CMAS information from CMAS broadcast 152. Network circuitry 113 adds the TAC and/or the access point identifier for user circuitry 111 to the CMAS instruction. Thus, network circuitry 113 may change the access point identifier so the identifier will be accepted by user circuitry 111.

Network circuitry 113 transfers the wireless relay instruction having the CMAS information and the TAC and/or access point identifier to user circuitry 111 over data link 112. User circuitry 111 receives the CMAS instruction having the CMAS information and TAC and/or access point identifier. In response to the CMAS instruction, user circuitry 111 wirelessly transmits CMAS broadcast 151 having the CMAS information to wireless user devices 101-103. Wireless user devices 101-103 wirelessly receive CMAS broadcast 151 and responsively alert their users with vibrations and tones. Wireless user devices 101-103 automatically display the CMAS information. In this example, wireless user devices 101-103 would alarm and display an imminent tornado warning for the current location.

User circuitry 111 generates a CMAS data record for CMAS broadcast 151. The CMAS data record indicates the CMAS data, the TAC/access point identifier, and the CMAS broadcast times. User circuitry 111 transfers the CMAS data record to network circuitry 113 over data link 112. Network circuitry 113 wirelessly transfers the CMAS data record to the wireless access point 120 for delivery to network core 130.

Figure 2:
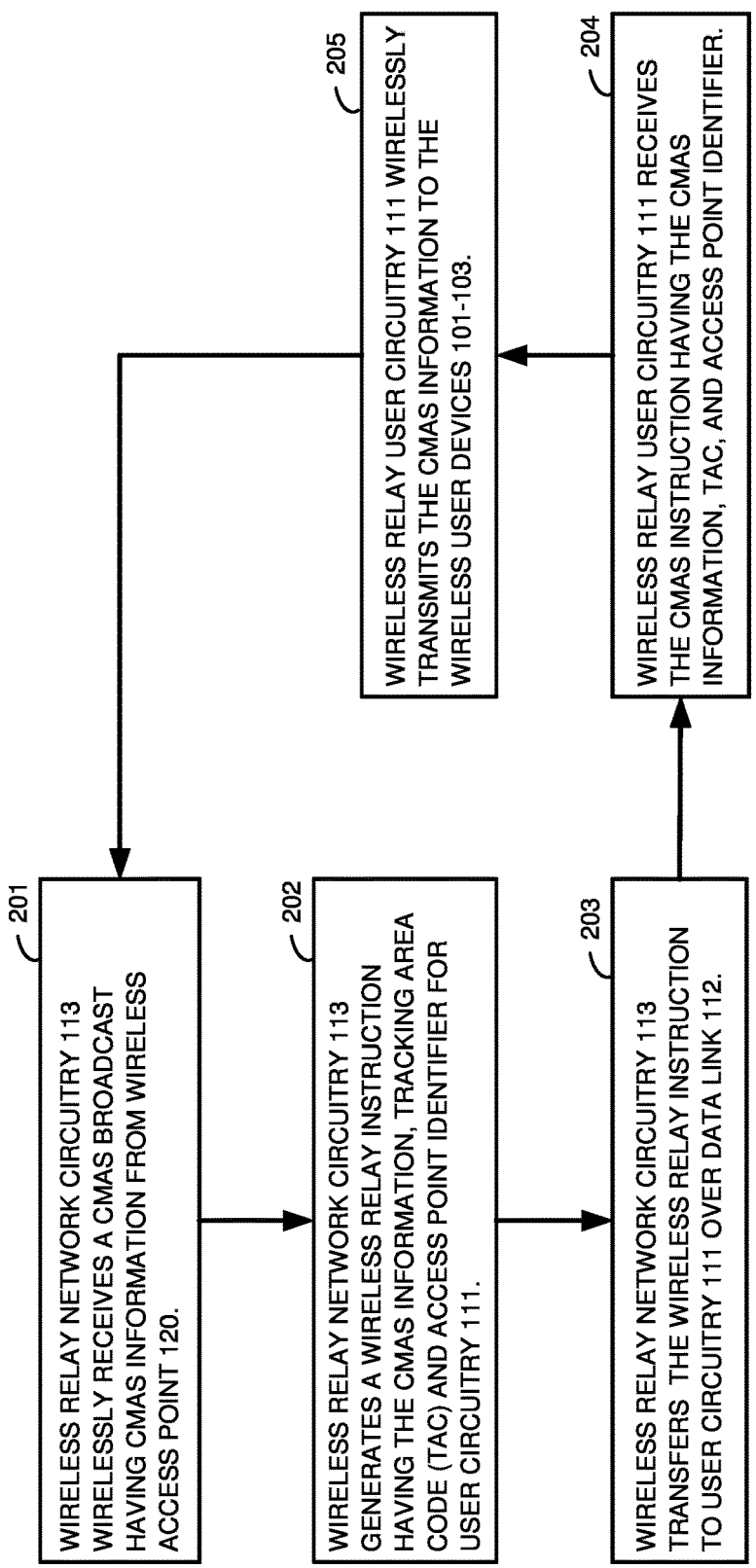
FIG. 2 illustrates the operation of the wireless relay to wirelessly transmit the CMAS information to the wireless user devices.

FIG. 2 illustrates the operation of wireless relay 110 to wirelessly transmit the CMAS information to wireless user devices 101-103. In wireless relay 110, network circuitry 113 wirelessly receives CMAS broadcast 152 having the CMAS information (201). In response to receiving CMAS broadcast 152, network circuitry 113 generates a wireless relay instruction having the CMAS information from CMAS broadcast 152 (202). Network circuitry 113 adds the TAC and the identifier for user circuitry 111. Network circuitry 113 transfers the wireless relay instruction having the CMAS information, TAC, and user circuitry 111 identifier over data link 112 (203). User circuitry 111 receives the CMAS instruction having the CMAS information, TAC, and access point identifier (204). In response to the TAC and access point identifier corresponding to user circuitry 111, user circuitry 111 wirelessly transmits CMAS broadcast 151 having the CMAS information to wireless user devices 101-103 (205).

Figure 3:
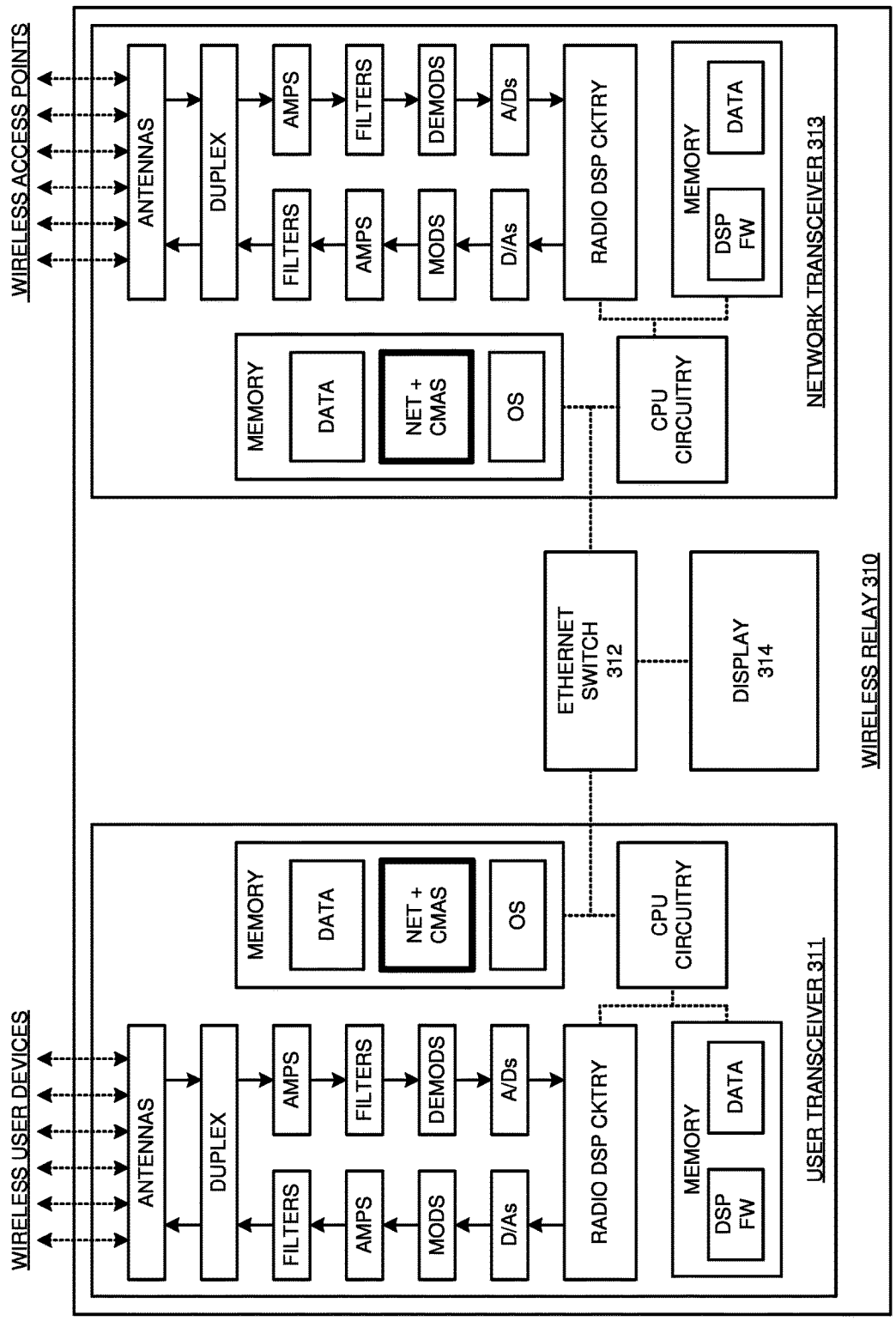
FIG. 3 illustrates wireless relay hardware that wirelessly transmits CMAS information to wireless user devices.

FIG. 3 illustrates hardware for wireless relay 310 that wirelessly transmits CMAS information to wireless user devices. Wireless relay 310 is an example of wireless relay 110, although relay 110 may have other configurations and operations. Wireless relay 310 comprises user transceiver 311, Ethernet switch 312, network transceiver 313, and display 314. User transceiver 311 corresponds to user circuitry 111. Ethernet switch 312 corresponds to data link 112. Network transceiver 313 corresponds to network circuitry 113.

User transceiver 311 comprises antennas, duplexers (DUPLEX), modulators, filters, amplifiers (AMPS), Analog-to- Digital converters (A/Ds), Digital-to-Analog converters (D/As), radio DSP circuitry, CPU circuitry, memories, and bus interfaces. The memories store data, DSP firmware (FW), operating system software (OS), and network/CMAS software. In user transceiver 311, the radio DSP circuitry executes the DSP FW to drive the wireless exchange of the user data with the wireless user devices. In user transceiver 311, the CPU circuitry executes the OS and network/CMAS software to control the exchange of the user data between the wireless user devices and network transceiver 313.

Network transceiver 313 comprises antennas, duplexers, modulators, filters, amplifiers, A/Ds, D/As, radio DSP circuitry, CPU circuitry, memories, and bus interfaces. The memories store data, DSP FW, OS, and network/CMAS software. In network transceiver 313, the radio DSP circuitry executes the DSP FW to drive the wireless exchange of the user data with the wireless access points. In network transceiver 313, the CPU circuitry executes the OS and network/CMAS software to control the exchange of the user data between the wireless access points and user transceiver 311.

Figure 4:
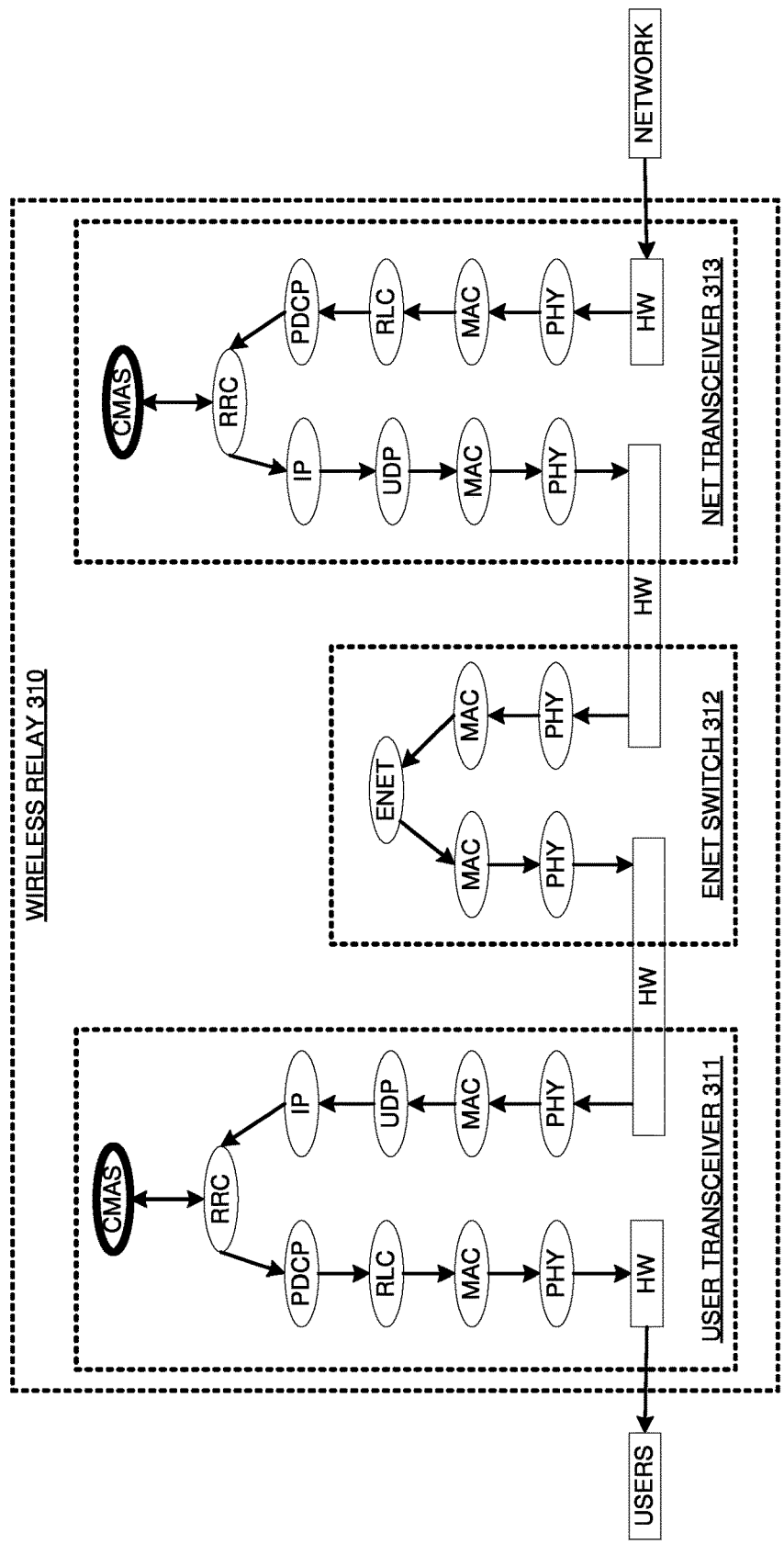
FIG. 4 illustrates wireless relay software that wirelessly transmits CMAS information the wireless user devices.

FIG. 4 illustrates software for wireless relay 310 that wirelessly receives CMAS information from a wireless network and that wirelessly transfers the CMAS information to wireless user devices. The software on FIG. 4 corresponds to the network/CMAS software on FIG. 3 that is executed by the CPU circuitry and Ethernet switch. Starting from the network-side and proceeding to the user-side, network transceiver 313 comprises a physical module (PHY) coupled to a Media Access Control module (MAC). The MAC is coupled to a Radio Link Control module (RLC). The RLC is coupled to a Packet Data Convergence Protocol module (PDCP). The PDCP is coupled to a Radio Resource Control module (RRC). The RRC is coupled to a CMAS module (CMAS) and to an IP module (IP). The IP is coupled to a User Datagram Protocol module (UDP). The UDP is coupled to a MAC, and the MAC is coupled to a PHY. In Ethernet switch 312, a PHY is coupled to a MAC, and the MAC is coupled to an Ethernet module (ENET). The ENET is coupled to a MAC, and the MAC is coupled to a PHY. In user transceiver 311, a PHY is coupled to a MAC which is coupled to a UDP. The UDP is coupled to an IP that is coupled to an RRC. The RRC is coupled to a CMAS and to a PDCP. The PDCP is coupled to an RLC which is coupled to a MAC. The MAC is coupled to a PHY. In user transceiver 311, Ethernet switch 312, and network transceiver 313, the PHYs call the OS to drive the hardware (HW) which is depicted on FIG. 3.

Figure 5:
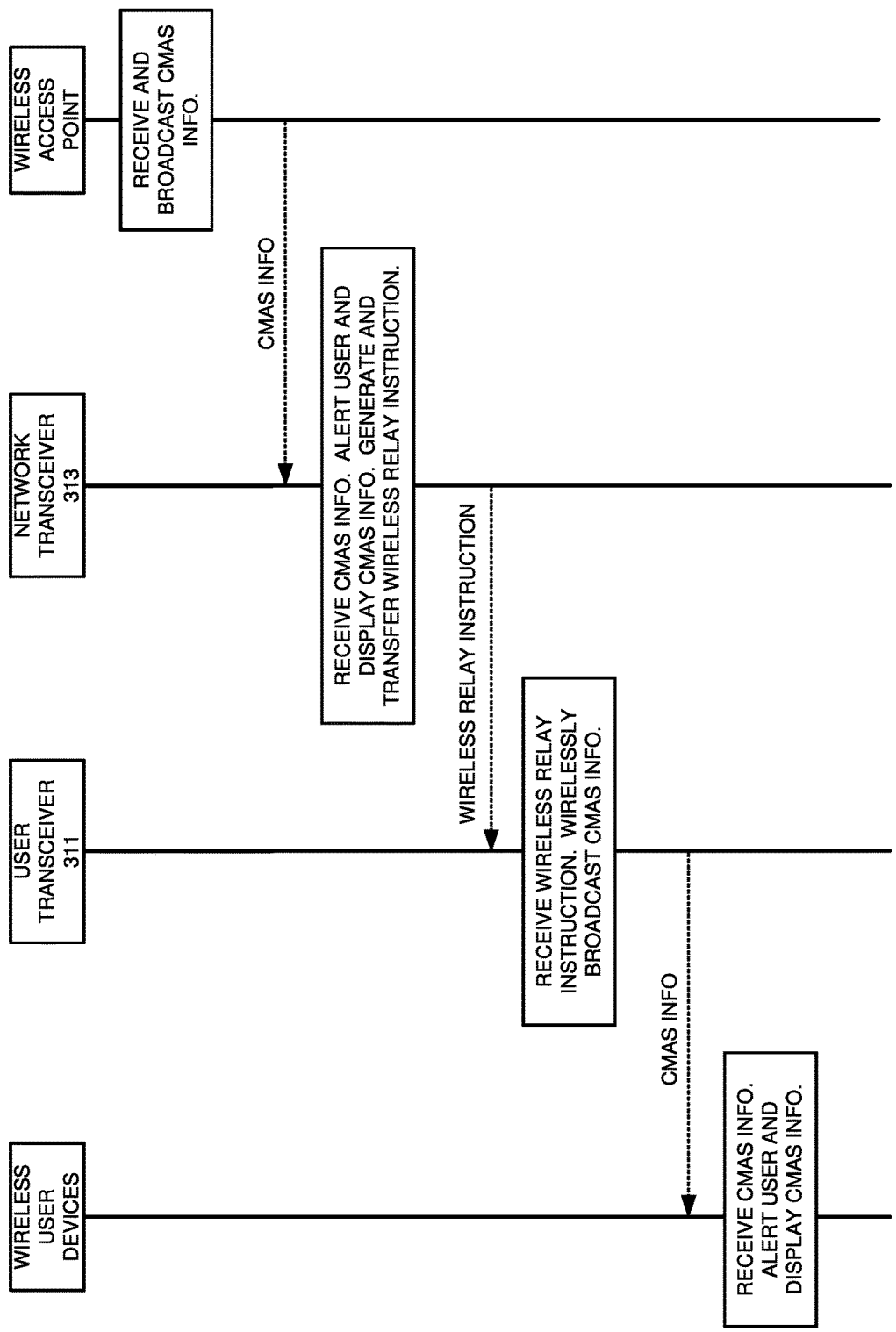
FIG. 5 illustrates the operation of the wireless relay configured with the hardware and software to wirelessly transmit CMAS information to the wireless user devices.

FIG. 5 illustrates the operation of wireless relay 310 to wirelessly transmit CMAS information to the wireless user devices. A wireless access point in a TAC receives CMAS information with the TAC and its access point identifier. Responsive to its TAC and identifier, the wireless access point wirelessly broadcasts the CMAS information. Network transceiver 313 in wireless relay 310 receives the broadcast CMAS information. Network transceiver 313 alerts the user and displays the CMAS information. Network transceiver 313 also generates and transfers a wireless relay instruction to user transceiver 311 having the CMAS information, the TAC, and a wireless access point identifier for user transceiver 311.

Referring to FIGS. 3-4, the antennas in network transceiver 313 receive a wireless signal and transfer corresponding electrical signals through the duplexer to the amplifier. The amplifier boosts the received signal for the filter which attenuates unwanted. A demodulator demodulates the amplified and filtered signal down from the carrier frequency. An analog-to-digital converter converts the demodulated analog receive signal into a digital receive signal for the radio DSP circuitry. The radio DSP circuitry recovers data from the receive signal and transfers the recovered data to memory. The recovered data includes the CMAS information. The CPU circuitry executes the OS to process the received data through the PHY, MAC, RLC, PDCP, and RRC. The RRC identifies the CMAS data transfers the CMAS data to the CMAS. The CMAS calls the OS to drive a display of the CMAS information on display 314. The CMAS calls the OS to drive other alerts like vibrations, lights, tones, and the like. The CMAS generates the wireless relay instruction for user transceiver 311 responsive to the CMAS information. The CMAS transfers the wireless relay instruction through the RRC, IP, GTP, UDP, MAC, PHY for delivery to user transceiver 311 over Ethernet switch 312. Ethernet switch 312 processes the wireless relay instruction through its PHY, MAC, and ENET during the transfer to user transceiver 311. In user transceiver 311, the CPU executes the OS to process the wireless relay instruction through the PHY, MAC, UDP, GTP, IP, and RRC. The RRC identifies the wireless relay instruction and transfers the instruction to the CMAS.

Referring to FIG. 5, user transceiver 311 receives the wireless relay instruction. User transceiver 311 detects its TAC and identifier and responsively broadcasts the CMAS information. The wireless user devices receive the wireless broadcast having the CMAS information. The wireless user devices responsively generate user alerts and display the CMAS information to their users.

Referring to FIGS. 3-4, the CMAS in user transceiver 311 identifies its TAC and identifier and responsively generates a broadcast instruction having the CMAS information. The CMAS transfers the broadcast instruction to the RRC. The CMAS also generates a CMAS data record having the CMAS information and broadcast metadata. The RRC transfers the broadcast instruction through the PDCP and RLC to the MAC. The MAC transfers data comprising a CMAS information broadcast to the PHY for transfer to the memory under OS control. The radio DSP circuitry reads the data for the CMAS information broadcast from the memory and generates a digital transmit signal having the CMAS information. The radio DSP transfers the digital transmit signal to the digital-to-analog converter that converts the signal into an analog transmit signal. A modulator upconverts the analog transmit signal to a carrier frequency. An amplifier and filter amplify and filter the analog transmit signal. The amplified and filtered transmit signal is fed through the duplexer to the antennas. The electronic analog transmit signal drives the antennas to broadcast a wireless transmit signal having the CMAS information.

Figure 6:
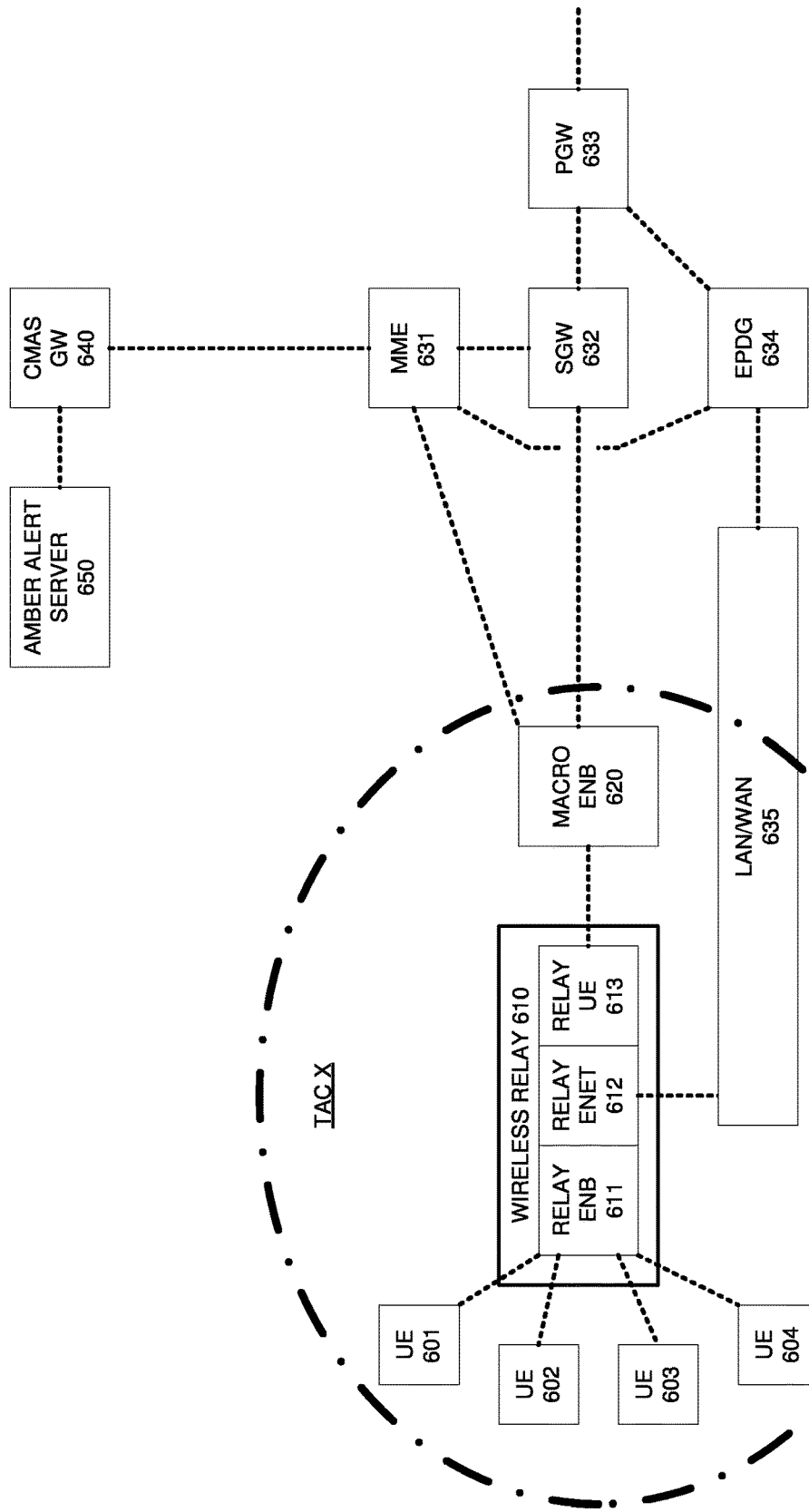
FIG. 6 illustrates a Long Term Evolution (LTE) wireless relay to wirelessly transmit CMAS information to the LTE User Equipment (UEs).

FIG. 6 illustrates Long Term Evolution (LTE) wireless relay 610 to wirelessly broadcast CMAS information to the LTE User Equipment (UEs) 601-604. Wireless relay 610 comprises relay evolved NodeB (ENB) 611, relay Ethernet switch (ENET) 612, and relay UE 613. Relay ENB 611 wirelessly serves UEs 601-604. Relay ENB 611 and relay UE 613 exchange data over relay ENET 612. Macro ENB 620 wirelessly serves Relay UE 613. Wireless relay 610 and macro ENB 620 are physically located in a TA identified by TAC X. Wireless relay 610 is an example of wireless relay 110, although relay 110 may have other configurations and operations. Relay ENB 611 corresponds to user circuitry 111. Relay ENET 612 corresponds to data link 112. Relay UE 613 corresponds to network circuitry 113.

Macro ENB 620 is coupled to Serving Gateway (SGW) 632 and to Mobility Management Entity (MME) 631. SGW 632 is coupled to MME 631 and to Packet Data Network Gateway (PGW) 633. PGW 633 is coupled to external networks. Relay ENET 612 is coupled to Local Area Network/Wide Area Network (LAN/WAN) 635 such as an Internet Service Provider (ISP). LAN/WAN 635 is coupled to evolved packet Data Gateway (ePDG) 634. ePDG 634 is coupled to MME 631 and PGW 633. MME 631 is coupled to CMAS gateway (GW) 640. In this example, CMAS gateway 640 is coupled to Amber Alert server 650.

Amber Alert server 650 issues a geographically-focused Amber Alert to UEs 601-604 as follows. Amber Alert server 650 generates CMAS information and geographic data that indicates a geographic area for the Amber Alert broadcast. For example, Amber Alert server 650 might transfer an Amber Alert for a child abduction in the metropolitan area where the abduction occurred. Amber Alert server 650 transfers the CMAS information and the geographic data to CMAS gateway 640.

CMAS gateway 640 receives the CMAS information and the geographic data. CMAS gateway 640 translates the geographic data into Tracking Area Codes (TACs) for various wireless networks. CMAS gateway 640 transfers the TACs and the CMAS information to the various wireless networks. In this example, CMAS gateway 640 transfers the CMAS information and TAC X to MME 631. MME 631 transfers the CMAS information and TAC X to macro ENB 620 over an LTE S1-MME link.

Macro ENB 620 receives the CMAS information and TAC X over the S1-MME. In response to detecting its own TAC X, macro ENB 620 wirelessly broadcasts the CMAS information in LTE System Information Blocks (SIBs) 1 and 12, where SIB 1 indicates the presence of the CMAS information and SIB 12 carries the actual CMAS information—the Amber Alert. In wireless relay 610, relay UE 613 wirelessly receives the LTE SIBs 1 and 12 having the CMAS information.

Responsive to the CMAS information, relay UE 613 generates a proxy LTE S1-MME message having the CMAS information and TAC X. The proxy LTE S1-MME message is formatted like the LTE S1-MME message that MME 631 sent to macro ENB 620. Relay UE 613 transfers the proxy LTE S1-MME message having the CMAS information and TAC X to relay ENB 611 over relay ENET 612.

Relay ENB 611 receives the proxy LTE S1-MME message having the CMAS information and TAC X. In response to the proxy S1-MME instruction for TAC X, relay ENB 611 wirelessly broadcasts the CMAS information in LTE SIBs 1 and 12 to UEs 601-604. UEs 601-604 wirelessly receive SIBs 1 and 12 having the CMAS information and responsively alert their users with vibrations and tones. UEs 601-604 automatically display the CMAS information. In this example, wireless user devices 601-604 would display an Amber Alert for a metropolitan area with information like names, physical descriptions, vehicle types, and the like.

Relay ENB 611 generates a CMAS data record for the CMAS broadcast. The CMAS data record indicates the CMAS information, TAC X, the ENB 611 identifier, and the CMAS broadcast times. In some examples, relay ENB 611 transfers the CMAS data record to MME 631 over its S1-MME link that traverses relay ENET 312, relay UE 613, and macro ENB 620—or that traverses relay ENET 312, LAN/WAN 635, and ePDG 634. In other examples, relay ENB 611 transfers the CMAS data record to relay UE 613 over relay ENET 312, and relay UE 613 transfers the CMAS data record to MME 631 over its NAS link that traverses macro ENB 620—or that traverses relay ENET 312, LAN/WAN 635, and ePDG 634.

In some alternative examples, MME 631 transfers the CMAS information and TAC X to relay UE 613 in a Non-Access Stratum (NAS) message. The NAS message having the CMAS information may traverse macro ENB 620 or the NAS message may traverse ePDG 634, LAN/WAN 635, and relay ENET 613. In these alternative examples, relay UE 613 would respond to this NAS/CMAS message like the above-described response to the SIB/CMAS broadcast.

Figure 7:
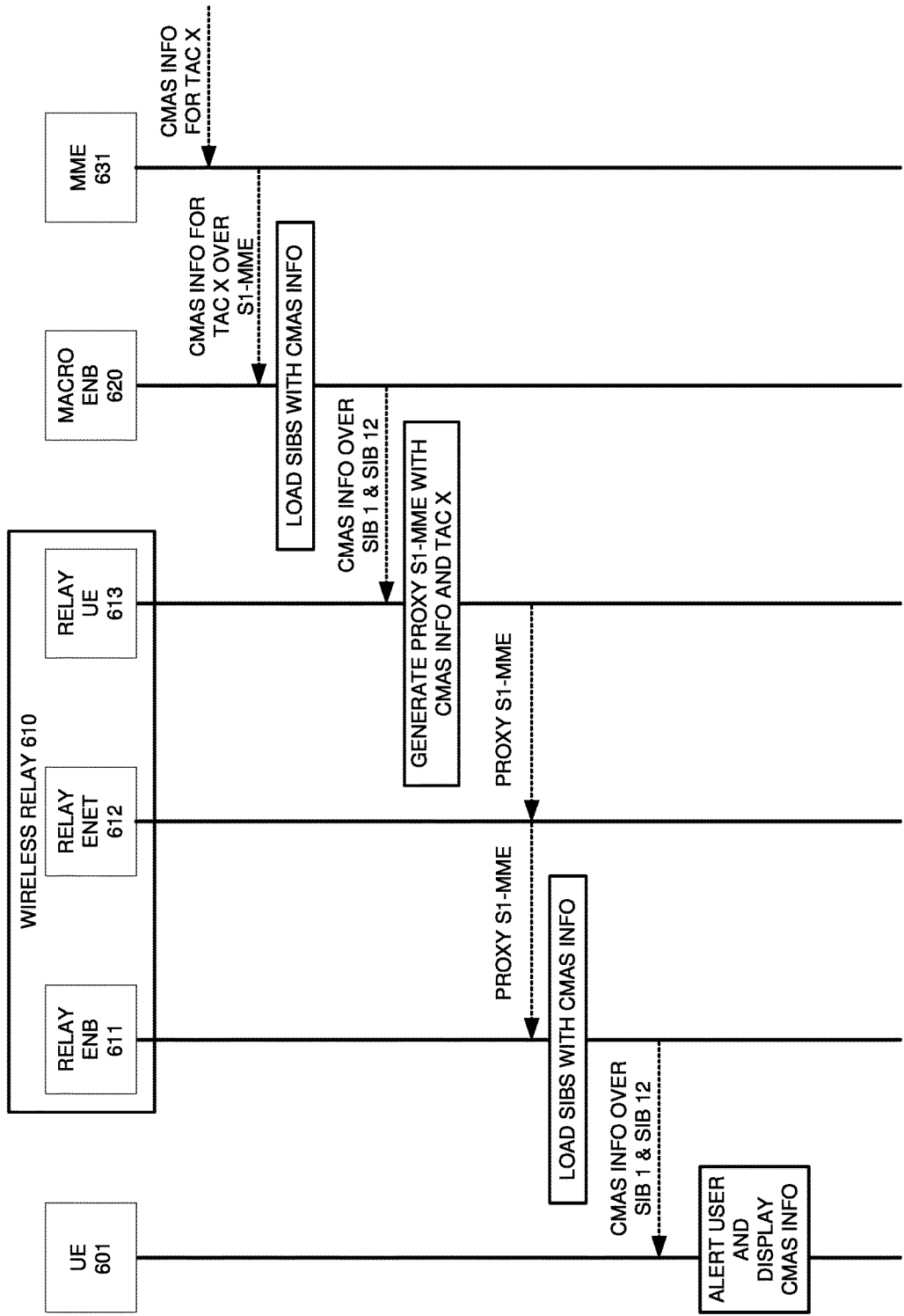
FIG. 7 illustrates the operation of the LTE wireless relay to wirelessly transmit CMAS information to the LTE UEs.

FIG. 7 illustrates the operation of LTE wireless relay 610 to wirelessly transmit CMAS information to LTE UE 601. MME 631 receives CMAS information for TAC X from CMAS gateway 640. MME 631 transfers the CMAS information and TAC X to macro ENB 620 over an LTE S1-MME link. Macro ENB 620 receives the CMAS information and TAC X. In response to detecting its own TAC X, macro ENB 620 loads SIBs 1 and 12 with the CMAS information and wirelessly broadcasts the CMAS information in the SIBs. In wireless relay 610, relay UE 613 wirelessly receives LTE SIBs 1 and 12 having the CMAS information.

In response to receiving the CMAS information, relay UE 613 generates a proxy LTE S1-MME message having the CMAS information and TAC X. The proxy LTE S1-MME message is like the LTE S1-MME message that MME 631 sent to macro ENB 620. Relay UE 613 transfers the proxy LTE S1-MME message having the CMAS information and TAC X to relay ENB 611 over relay ENET 612. Relay ENB 611 receives the proxy LTE S1-MME message having the CMAS information and TAC X. In response to the proxy S1-MME instruction for its own TAC X, relay ENB 611 wirelessly broadcasts the CMAS information in LTE SIBs 1 and 12 to UE 601.

Thus, relay ENB 611 responds to the proxy S1-MME CMAS message from relay UE 613 in the same manner that macro ENB 620 responded to the S1-MME CMAS message from MME 631. UE 601 wirelessly receive SIBs 1 and 12 having the CMAS information. In response, UE 601 alerts its user with vibrations and tones and automatically displays the CMAS information.

In some alternative examples, an Element Management System (EMS) for relay UE 613 could be used to transfer the CMAS information for TAC X to relay UE 613. Relay UE 613 would respond to the EMS CMAS message in a similar way to its response to the CMAS SIBs from macro ENB 620. In other alternative examples, an EMS for relay ENB 611 could be used to transfer the CMAS information for TAC X to relay ENB 611. Relay ENB 611 would respond to the EMS CMAS message in a similar way to its response to the proxy S1-MME CMAS message from relay UE 613.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless relay to wirelessly transmit Commercial Mobile Alert System (CMAS) information to wireless user devices, the method comprising:

in the wireless relay, network circuitry wirelessly receiving a CMAS broadcast having CMAS information data and a CMAS Tracking Area Code (TAC) from a wireless communication network and responsively generating a wireless relay instruction having the CMAS information data and the CMAS TAC;

in the wireless relay, the network circuitry transferring the wireless relay instruction to at least one of a Long Term Evolution (LTE) evolved NodeB (eNodeB) and a Fifth Generation New Radio (5G NR) NodeB (gNodeB) user circuitry; and in the wireless relay, the at least one of the eNodeB and the gNodeB user circuitry receiving the wireless relay instruction having the CMAS information data and the CMAS TAC and in response to the CMAS TAC, wirelessly transmitting the CMAS information data to the wireless user devices.

2. The method of claim 1 wherein the network circuitry wirelessly receiving the CMAS broadcast having the CMAS information data and the CMAS TAC comprises the network circuitry in the wireless relay wirelessly receiving Long Term Evolution (LTE) System Information Blocks (SIBs).

3. The method of claim 1 wherein the network circuitry wirelessly receiving the CMAS broadcast having the CMAS information data and the CMAS TAC comprises the network circuitry in the wireless relay receiving a Long Term Evolution (LTE) Non-Access Stratum (NAS) message.

4. The method of claim 1 wherein the network circuitry generating and transferring the wireless relay instruction comprises the network circuitry in the wireless relay generating and transferring a Long Term Evolution (LTE) Mobility Management Entity (MME) message having the CMAS information data and the CMAS TAC.

5. The method of claim 1 wherein the at least one of the eNodeB and the gNodeB user circuitry wirelessly transmitting the CMAS information data to the wireless user devices comprises the at least one of the eNodeB and the gNodeB user circuitry in the wireless relay wirelessly transmitting Long Term Evolution (LTE) System Information Blocks (SIBs) having the CMAS information data to the wireless user devices.

6. The method of claim 1 wherein the TAC is received from the network circuitry in the wireless relay.

7. The method of claim 1 further comprising:
the network circuitry generating and transferring the CMAS information data and the CMAS TAC to a wireless relay display responsive to the receipt of the CMAS broadcast; and
the wireless relay display graphically presenting the CMAS information data and a CMAS TAC.

8. The method of claim 1 further comprising
in the wireless relay, the at least one of the eNodeB and the gNodeB user circuitry generating a CMAS data record of the wireless transmission of the CMAS information data and the CMAS TAC to the wireless user devices and transferring the CMAS data record to the network circuitry; and in the wireless relay, the network circuitry receiving the CMAS data record and responsively transferring the CMAS data record to the wireless communication network.

9. The method of claim 1 further comprising
in the wireless relay, the at least one of the eNodeB and the gNodeB user circuitry generating a CMAS data record of the wireless transmission of the CMAS information data and the CMAS TAC to the wireless user devices and transferring the CMAS data record to the network circuitry; and
in the wireless relay, the network circuitry receiving the CMAS data record and responsively generating a Long Term Evolution (LTE) Non-Access Stratum (NAS) message having the CMAS data record and transferring the NAS message with the CMAS data record to an LTE Mobility Management Entity (MME) in the wireless communication network.

10. The method of claim 1 wherein:
the network circuitry in the wireless relay comprises Long Term Evolution (LTE) User Equipment (UE); and
the at least one of the eNodeB and the gNodeB user circuitry in the wireless relay comprises an LTE NodeB.

11. A wireless relay to wirelessly transmit Commercial Mobile Alert System (CMAS) information to wireless user devices, the wireless relay comprising:
in the wireless relay, network circuitry configured to wirelessly receive a CMAS broadcast having CMAS information data and a CMAS Tracking Area Code (TAC) from a wireless communication network and responsively generate a wireless relay instruction having the CMAS information data and a CMAS TAC;
in the wireless relay, the network circuitry configured to transfer the wireless relay instruction to at least one of a Long Term Evolution (LTE) evolved NodeB (eNodeB) and a Fifth Generation New Radio (5G NR) NodeB (gNodeB) user circuitry; and
in the wireless relay, the at least one of the eNodeB and the gNodeB user circuitry configured to receive the wireless relay instruction having the CMAS information data and the CMAS TAC and in response to the CMAS TAC, wirelessly transmit the CMAS information data to the wireless user devices.

12. The wireless relay of claim 11 wherein the network circuitry is configured to wirelessly receive the CMAS broadcast in Long Term Evolution (LTE) System Information Blocks (SIBs).

13. The wireless relay of claim 11 wherein the network circuitry is configured to wirelessly receive the CMAS broadcast in a Long Term Evolution (LTE) Non-Access Stratum (NAS) message.

14. The wireless relay of claim 11 wherein the network circuitry is configured to generate and transfer the wireless relay instruction in a Long Term Evolution (LTE) Mobility Management Entity (MME) message having the CMAS information data and the CMAS TAC.

15. The wireless relay of claim 11 wherein the at least one of the eNodeB and the gNodeB user circuitry is configured to wirelessly transmit Long Term Evolution (LTE) System Information Blocks (SIBs) having the CMAS information data to the wireless user devices.

16. The wireless relay of claim 11 wherein the TAC is received from the network circuitry.

17. The wireless relay of claim 11 further comprising:
the network circuitry is configured to generate and transfer the CMAS information data and the CMAS TAC to a wireless relay display responsive to the receipt of the CMAS broadcast; and
the wireless relay display configured to graphically present the CMAS information data and the CMAS TAC.

18. The wireless relay of claim 11 further comprising
the at least one of the eNodeB and the gNodeB user circuitry configured to generate a CMAS data record of the wireless transmission of the CMAS information data and the CMAS TAC to the wireless user devices and transfer the CMAS data record to the network circuitry; and
the network circuitry configured to receive the CMAS data record and responsively transfer the CMAS data record to the wireless communication network.

19. The wireless relay of claim 11 further comprising the at least one of the eNodeB and the gNodeB user circuitry configured to generate a CMAS data record of the wireless transmission of the CMAS information data and a CMAS TAC to the wireless user devices and transfer the CMAS data record to the network circuitry; and the network circuitry is configured to receive the CMAS data record and responsively generate a Long Term Evolution (LTE) Non-Access Stratum (NAS) message having the CMAS data record and transfer the NAS message with the CMAS data record to an LTE Mobility Management Entity (MME) in the wireless communication network.

20. The wireless relay of claim 11 wherein: the network circuitry in the wireless relay comprises Long Term Evolution (LTE) User Equipment (UE); and the at least one of the eNodeB and the gNodeB user circuitry in the wireless relay comprises an LTE NodeB.

* * * * *